(12) United States Patent
Agarwal et al.

(10) Patent No.: US 8,677,322 B2
(45) Date of Patent: Mar. 18, 2014

(54) DEBUGGING IN A MULTIPLE ADDRESS SPACE ENVIRONMENT

(75) Inventors: Amit Kumar Agarwal, Bellevue, WA (US); Weirong Zhu, Issaquah, WA (US); Yosseff Levanoni, Redmond, WA (US); Yongkang Zhu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 13/172,521

(22) Filed: Jun. 29, 2011

(65) Prior Publication Data

US 2013/0007712 A1    Jan. 3, 2013

(51) Int. Cl.
    G06F 9/44    (2006.01)
(52) U.S. Cl.
    USPC ............ 717/124; 717/127; 717/128; 717/131
(58) Field of Classification Search
    None
    See application file for complete search history.

(56) References Cited

U.S. PATENT DOCUMENTS

| 4,493,027 | A | 1/1985 | Katz et al. |
| 6,021,275 | A | 2/2000 | Horwat |
| 6,071,317 | A | 6/2000 | Nagel |
| 6,081,665 | A | 6/2000 | Nilsen et al. |
| 6,502,237 | B1 | 12/2002 | Yates et al. |
| 6,809,732 | B2 | 10/2004 | Zatz |
| 6,988,264 | B2 | 1/2006 | Sarma |
| 7,111,290 | B1 | 9/2006 | Yates et al. |
| 7,600,155 | B1 | 10/2009 | Nickolls et al. |
| 7,836,430 | B2 * | 11/2010 | Shebs ........................... 717/124 |
| 7,950,001 | B2 * | 5/2011 | Panchamukhi et al. ........ 717/124 |
| 7,975,260 | B1 * | 7/2011 | Conover ........................ 717/127 |
| 8,146,061 | B2 | 3/2012 | Xu et al. |
| 8,166,450 | B2 | 4/2012 | Fuhler et al. |
| 8,261,242 | B2 * | 9/2012 | Booth et al. ................... 717/128 |
| 8,341,604 | B2 * | 12/2012 | Codrescu et al. ............. 717/129 |
| 8,429,617 | B2 | 4/2013 | Demetriou et al. |
| 8,468,500 | B2 * | 6/2013 | Hatabu .......................... 717/124 |
| 2003/0145282 | A1 | 7/2003 | Thomas et al. |
| 2003/0145310 | A1 | 7/2003 | Thames et al. |
| 2003/0163801 | A1 | 8/2003 | Thames et al. |
| 2004/0111707 | A1 | 6/2004 | Bliss |

(Continued)

FOREIGN PATENT DOCUMENTS

| CN | 1266513 A | 9/2000 |
| WO | WO 2008002350 A1 | 1/2008 |

OTHER PUBLICATIONS

Venkataramani et al., MemTracker: An accelerator for memory debugging and monitoring, Jun. 2009, 33 pages.*

(Continued)

*Primary Examiner* — Thuy Dao
(74) *Attorney, Agent, or Firm* — Brian Haslam; Kevin Sullivan; Micky Minhas

(57) ABSTRACT

The present invention extends to methods, systems, and computer program products for debugging in a multiple address space environment. Embodiments of the invention include techniques for recording debug information used for translating between an abstract unified address space and multiple address spaces at a target system (e.g., a co-processor, such as, a GPU or other accelerator). A table is stored in the recorded debug information. The table includes one or more entries mapping compiler assigned IDs to address spaces. During debugging within a symbolic debugger, the recorded debug information can be used for viewing program data across multiple address spaces in a live debugging session.

20 Claims, 6 Drawing Sheets

(56) References Cited

U.S. PATENT DOCUMENTS

| | | | |
|---|---|---|---|
| 2004/0205747 | A1 | 10/2004 | Bernstein et al. |
| 2004/0268331 | A1 | 12/2004 | Mitchell et al. |
| 2005/0066308 | A1 | 3/2005 | Han |
| 2005/0097399 | A1 | 5/2005 | Bliss et al. |
| 2006/0048098 | A1 | 3/2006 | Gatlin et al. |
| 2006/0069953 | A1 | 3/2006 | Lippet et al. |
| 2007/0018980 | A1 | 1/2007 | Berteig |
| 2007/0250820 | A1* | 10/2007 | Edwards et al. .............. 717/131 |
| 2007/0271553 | A1 | 11/2007 | Higgins et al. |
| 2009/0006895 | A1 | 1/2009 | May et al. |
| 2009/0282390 | A1 | 11/2009 | Geselowitz |
| 2009/0307667 | A1 | 12/2009 | Booth et al. |
| 2010/0131934 | A1 | 5/2010 | Kim et al. |
| 2010/0149185 | A1 | 6/2010 | Caperwell |
| 2011/0072309 | A1 | 3/2011 | Sakai et al. |
| 2011/0214109 | A1* | 9/2011 | Pedersen ...................... 717/128 |
| 2012/0159258 | A1 | 6/2012 | Maybee |
| 2012/0167062 | A1 | 6/2012 | Levanoni |
| 2012/0317394 | A1 | 12/2012 | Zhu |
| 2013/0007712 | A1 | 1/2013 | Agarwal et al. |

OTHER PUBLICATIONS

Orso et al., Classifying data dependences in the presence of pointers for program comprehension, testing, and debugging, Apr. 2004, 41 pages.*

George C. Necula et al., "CIL: Intermediate Language and Tools for Analysis and Transformations for C Programs", 2002 [Retrieved on Feb. 27, 2013] retriefed from the internet: <URL: http://download.springer.com/static/pdf/21/chp%253A10.1007%252F3-540-45937-5_16.pdf?auth66=1363282191_a5b9292a8db54ed128fc73f27ab0ad1b&ext=.pdf> 16 pages.

Office Action dated May 9, 2013 cited in U.S. Appl. No. 12/969,482.

Notice of Allowance dated May 15, 2013 cited in U.S. Appl. No. 13/158,077.

opensourceproject.ogr.cn, "Debugging Multiple Tasks", 2007, 5 pages.

Banks, "C Support for Multiple Address Spaces in Embedded Systems", May 31, 2001, 5 pages.

UNIX International, "DWARF Debugging Information Format", Jul. 27, 1993, 108 pages.

Watson, Greg, et al., "Relative Debugging for Data-Parallel Programs: A ZPL Case Study", Oct. 2000 IEEE, pp. 42-52.

Debug a Vertex Shader, Oct. 11, 2010, (Retrieved date) 6 pages.

DirectX Software Development Kit, Oct. 11, 2010, (Retrieved Date) 4 pages.

D3DXSHADER Flags, Sep. 14, 2010, 4 pages.

Greg Watson, "PTP Design Document", Nov. 10, 2007, 12 pages.

Gregory Pakosz, "How to Debug DirectX 11 Compute Shader?", Dec. 19, 2009, 1 page.

PIX, Oct. 11, 2010 (Retrieved Date), 2 pages.

NVIDIA Parallel Nsight, Sep. 22, 2010, 2 pages.

Appendix B: Debugging and Profiling Parallel Applications, Pub. Date: 2010, 9 pages.

NVIDIA Compute, "PTX: Parallel Thread Execution" ISA Version 1.1, Oct. 24, 2007, 93 pages.

Bleisweiss, Avi, "Shading Compilers", Based on information and belief available, at least as early as Jan. 3, 2011, 22 pages.

Lejdfors, Calle, et al., "PyFX: A Framework for Programming Real-Time Effects", at least as early as Jan. 3, 2011, 12 pages.

Notice of Allowance dated Oct. 28, 2013 in U.S. Appl. No. 12/969,482.

* cited by examiner

DEBUGGING IN A MULTIPLE ADDRESS SPACE ENVIRONMENT

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

To develop a software application for performing a computing task, a developer typically writes source code (e.g., in C++, Visual Basic, etc.) that expresses the desired functionality of the software application. The source code can then be compiled into executable code (or alternately interpreted at execution time). During source code compilation, a compiler converts source code instructions into machine instructions (e.g., x86 instructions) that are directly executable on a computer system. The executable code is run on a computer system to implement the desired functionality.

During development, a debugger can be used to debug software application to assist a developer in addressing inappropriate and/or undesirable application functionality. A debugger allows a developer to examine the internal workings and data values of an application during execution.

Some development environments, such as, for example, those using Graphical Processing Units ("GPUs"), can include multiple address spaces. In these development environments, a unified address abstraction can be used to provide developers the ability to transparently reference memory locations across the multiple address spaces in their programs. However, this can be problematic for debugging, since a debugger has no way to know how to translate the unified address space abstraction between appropriate target address spaces during debugging.

BRIEF SUMMARY

The present invention extends to methods, systems, and computer program products for debugging in a multiple address space environment. In some embodiments, debug information is recorded. The debugging information maps between a unified address space and a plurality of target address spaces. Source code for an application is accessed. The source code includes a plurality of variables denoting storage locations. The source code utilizes unified address space pointers to provide a unified address space abstraction. The unified address space pointers reference storage locations in the unified address space. The source code also includes statements and expressions for assigning the address of one or more of the plurality of variables to one or more corresponding unified address space pointers and for dereferencing the one or more corresponding unified address space pointers.

The source code is compiled into lower level code for execution on a target system. Compilation of the source code includes allocating at least one of the plurality of variables to a first address space and allocating at least one other of the plurality of variables to a second different address space. Accordingly, the first address space is referenced through the at least one variable allocated to the first address space and the second different address space is referenced through the at least one other variable allocated to the second different address space.

Each unified address space pointer is represented using a two component pointer including a tag component and an offset component. The tag component is configured to store an identifier value representing a target address space. The offset component is configured to store an offset value indicating a relative offset within the represented target address space.

Debug information for the application is accumulated. The debug information can be used to translate between the unified address space and the plurality of target address spaces. Accumulating debug information includes, for each unified address space pointer variable in the source code, recording a designated storage location for the tag component and offset component of the corresponding two component pointer. Accumulating debug information includes generating a table for storing mapping entries. Each mapping entry maps an identifier value to a storage location for a target address space.

Accumulating debug information includes for each assignment of a program variable address to a unified address space pointer in the source code, inserting a mapping entry into the table. The mapping entry maps an identifier value for the program variable to the storage location of the target address space for the program variable. The identifier value is also assigned to the tag component of the two component pointer corresponding to the unified address pointer. The accumulated debug information is stored for use in a debugging session.

In other embodiments, debug information is used to debug an application that is configured to use a plurality of target address spaces. A command to debug an application is received. In response to the received command, the application is debugged. Statements and expressions of higher level code representing the application are accessed. The statements and expressions refer to storage locations through an address space abstraction that abstracts the plurality of target address spaces. The statements and expressions define and use a plurality of unified address space pointers. The plurality of unified address space pointers use the unified address space abstraction to access storage locations.

A plurality of lower level instructions of lower level code translated from the statements and expressions is accessed. The plurality of lower level instructions represents each unified address space pointer using a two component pointer. The two component pointer includes a tag component for storing an identifier value representing a target address space and an offset component value for storing an offset value indicating a relative offset within the represented target address space.

The plurality of lower level instructions assign address values to a pointer by assigning one or more of: an identifier value to a tag component and an offset value to a corresponding offset component value to identify a storage location within a represented target address space. The plurality of lower level instructions dereference a pointer by reading from or writing to a storage location in a target address space based on an identifier value stored in tag component value and an offset value stored in a corresponding offset component value.

Dereference of a source program pointer variable in the accessed higher level source code is evaluated. The evaluation includes referring to debug information for the debugger to determine designated storage locations for the tag component and the offset component of the pointer. The evaluation includes reading a tag value from the designated storage location for the tag component and reading an offset value from the designated storage location for the offset component. The evaluation includes referring to a debug information map that maps tag values to variables to determine the storage location of the target address space corresponding to the tag value. The evaluation includes reading the contents from the target address space and the offset specified by the offset value. The read contents can be presented within the debugger.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
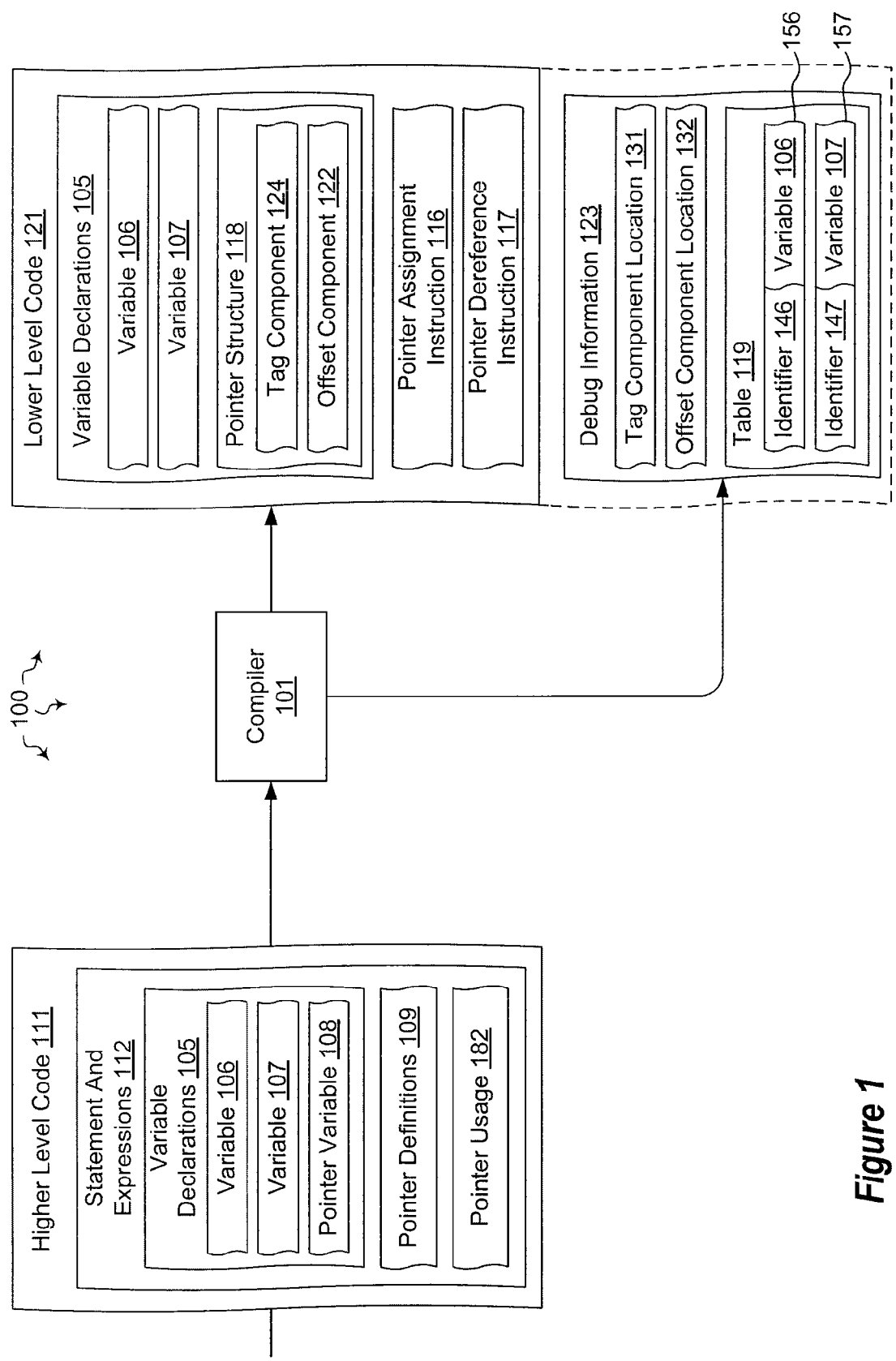
FIG. 1 illustrates an example computer architecture that facilitates recording debug information from an application.

The present invention extends to methods, systems, and computer program products for debugging in a multiple address space environment. In some embodiments, debug information is recorded. The debugging information maps between a unified address space and a plurality of target address spaces. Source code for an application is accessed. The source code includes a plurality of variables denoting storage locations. The source code utilizes unified address space pointers to provide a unified address space abstraction. The unified address space pointers reference storage locations in the unified address space. The source code also includes statements and expressions for assigning the address of one or more of the plurality of variables to one or more corresponding unified address space pointers and for dereferencing the one or more corresponding unified address space pointers.

The source code is compiled into lower level code for execution on a target system. Compilation of the source code includes allocating at least one of the plurality of variables to a first address space and allocating at least one other of the plurality of variables to a second different address space. Accordingly, the first address space is referenced through the at least one variable allocated to the first address space and the second different address space is referenced through the at least one other variable allocated to the second different address space.

Each unified address space pointer is represented using a two component pointer including a tag component and an offset component. The tag component is configured to store an identifier value representing a target address space. The offset component is configured to store an offset value indicating a relative offset within the represented target address space.

Debug information for the application is accumulated. The debug information can be used to translate between the unified address space and the plurality of target address spaces. Accumulating debug information includes, for each unified address space pointer variable in the source code, recording a designated storage location for the tag component and offset component of the corresponding two component pointer. Accumulating debug information includes generating a table for storing mapping entries. Each mapping entry maps an identifier value to a storage location for a target address space.

Accumulating debug information includes for each assignment of a program variable address to a unified address space pointer in the source code, inserting a mapping entry into the table. The mapping entry maps an identifier value for the program variable to the storage location of the target address space for the program variable. The identifier value is also assigned to the tag component of the two component pointer corresponding to the unified address pointer. The accumulated debug information is stored for use in a debugging session.

In other embodiments, debug information is used to debug an application that is configured to use a plurality of target address spaces. A command to debug an application is received. In response to the received command, the application is debugged. Statements and expressions of higher level code representing the application are accessed. The statements and expressions refer to storage locations through an address space abstraction that abstracts the plurality of target address spaces. The statements and expressions define and use a plurality of unified address space pointers. The plurality of unified address space pointers use the unified address space abstraction to access storage locations.

A plurality of lower level instructions of lower level code translated from the statements and expressions is accessed. The plurality of lower level instructions represents each unified address space pointer using a two component pointer. The two component pointer includes a tag component for storing an identifier value representing a target address space and an offset component value for storing an offset value indicating a relative offset within the represented target address space.

The plurality of lower level instructions assign address values to a pointer by assigning one or more of: an identifier value to a tag component and an offset value to a corresponding offset component value to identify a storage location within a represented target address space. The plurality of lower level instructions dereference a pointer by reading from or writing to a storage location in a target address space based on an identifier value stored in tag component value and an offset value stored in a corresponding offset component value.

Dereference of a source program pointer variable in the accessed higher level source code is evaluated. The evaluation includes referring to debug information for the debugger to determine designated storage locations for the tag component and the offset component of the pointer. The evaluation includes reading a tag value from the designated storage location for the tag component and reading an offset value from the designated storage location for the offset component. The evaluation includes referring to a debug information map that maps tag values to variables to determine the storage location of the target address space corresponding to the tag value. The evaluation includes reading the contents from the target address space and the offset specified by the offset value. The read contents can be presented within the debugger.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Embodiments of the invention include techniques for recording debug information pertaining to translation between an abstract unified address space and target multiple address spaces. Embodiments of the invention also include using recorded debug information within a symbolic debugger to support the use of unified address space symbolic references for viewing program data across multiple address spaces in a live debugging session.

Those skilled in the art will appreciate that the invention may be practiced in network computing environments with many types of computer system configurations, including, personal computers, desktop computers, laptop computers, message processors, hand-held devices, multi-processor systems (including systems with a one or more Central Processing Units ("CPUs") and one or more co-processors, for example, Graphical Processing Units ("GPUs") or accelerators), microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates recording debug information. Referring to FIG. 1, computer architecture 100 includes compiler 101. Components of compiler 101 can be connected to one another over (or be part of) a system bus and/or a network, such as, for example, a Local Area Network ("LAN"), a Wide Area Network ("WAN"), and even the Internet. Accordingly, each of the components of compiler 101 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

Generally, compiler 101 is configured to compile (translate) high level code into lower level code. In some embodiments, compiler 101 is a single stage compiler. In other embodiments, compiler 101 is a multi-stage compiler. For example, compiler 101 can include multiple compiler stages for translating C++ extended for parallel environments to High Level Shader Language ("HLSL") byte code. A first compiler stage can translate C++ extended for parallel environments into HLSL source level shaders. A second stage can translate HLSL source level shaders into HLSL byte code. The HLSL byte code can be executed on a co-processor, such as, for example, a GPU or accelerator.

Each stage of compiler 101 (whether there be a single compiler stage or multiple compiler stages) can include code analyzer (e.g., a front-end) and a code generator (e.g., a back-end). The code analyzer can receive elements of higher level code (e.g., C++ extended for parallel environments or HLSL source level shaders). The code analyzer can analyze the received higher level code including: performing syntactical analysis (e.g., parsing), performing semantic analysis, generating an intermediate representation ("IR"), managing a symbol table, etc. The code generator analyzes the IR and generates lower level code (e.g., HLSL source level shaders or HLSL byte code respectively) from the IR. Code generation can include resource and storage decisions, such as, for example, deciding which variables to fit into registers and memory (register allocation).

Each compilation stage can record debug information that can be used within a debugger to debug higher level code. For example, a compiler stage for translating C++ extended for parallel environments to HLSL source level shaders can record debug information that maps between C++ locations and symbols and HLSL source locations and symbols. Likewise, a compiler stage for translating between HSLS source level shaders and HLSL byte code can record debug information that maps between HLSL source locations and symbols and HLSL byte code addresses and registers (e.g., of a target GPU).

Compiler 101 or another external module (not shown) can combine debug information from multiple stages to create a direct mapping between higher level code received at a first compiler stage (e.g., C++ extended for parallel environments source code) and lower level code (e.g, HLSL byte code) output from a final compiler stage. For example, compiler 101 or other external module can create a direct mapping between C++ locations and symbols and HLSL byte code addresses and registers.

In some embodiments, higher level code and lower level code represent various program features differently. For example, C++ extended for parallel environments can use unified address space pointers to provide a unified address space abstraction. Compiler 101 can support the unified address space abstraction. However, a target co-processor (e.g., GPU or other accelerator) may not support the unified address abstraction and may instead use a plurality of different address spaces, such as, for example, an address space for each variable. To compensate for different program features, such as, for example, address space representations, compiler 101 can generate code for emulating a higher level code feature that is not natively support in lower level code. For example, compiler 101 can generate pointer emulation instructions in lower level code to emulate the use of unified address space pointers defined in higher level code.

Within lower level code, compiler 101 can emulate each unified address space pointer using a two component pointer including a tag component and an offset component. The tag component can store a value representing a target address space (from among a plurality of address spaces) and the offset value can store a value representing a relative offset within the target address space. Thus, a two component pointer in lower level code is used to emulate functionality of a unified address space pointer defined in higher level code. To facilitate debugging, compiler 101 can also record appropriate debug information indicating the storage location of a tag component and corresponding offset component and mapping between a two component pointer and a unified address space pointer. The appropriate debug information can be used within a debugger to debug higher level code (e.g., to access a value from a storage location).

In some embodiments, recorded debugging information, such as, for example, a mapping between locations and symbols and addresses and registers is stored in a separate (but associated) file. In other embodiments, recorded debug information is stored along with generated lower level code. In further embodiments, some recorded debug information is stored in a separate (but associated) file and some recorded debug information is stored along with generated lower level code.

Debug information can be stored (whether it be separate from or along with generated lower level code) in a variety of different formats, including Program Database ("PDB") files.

Figure 3:
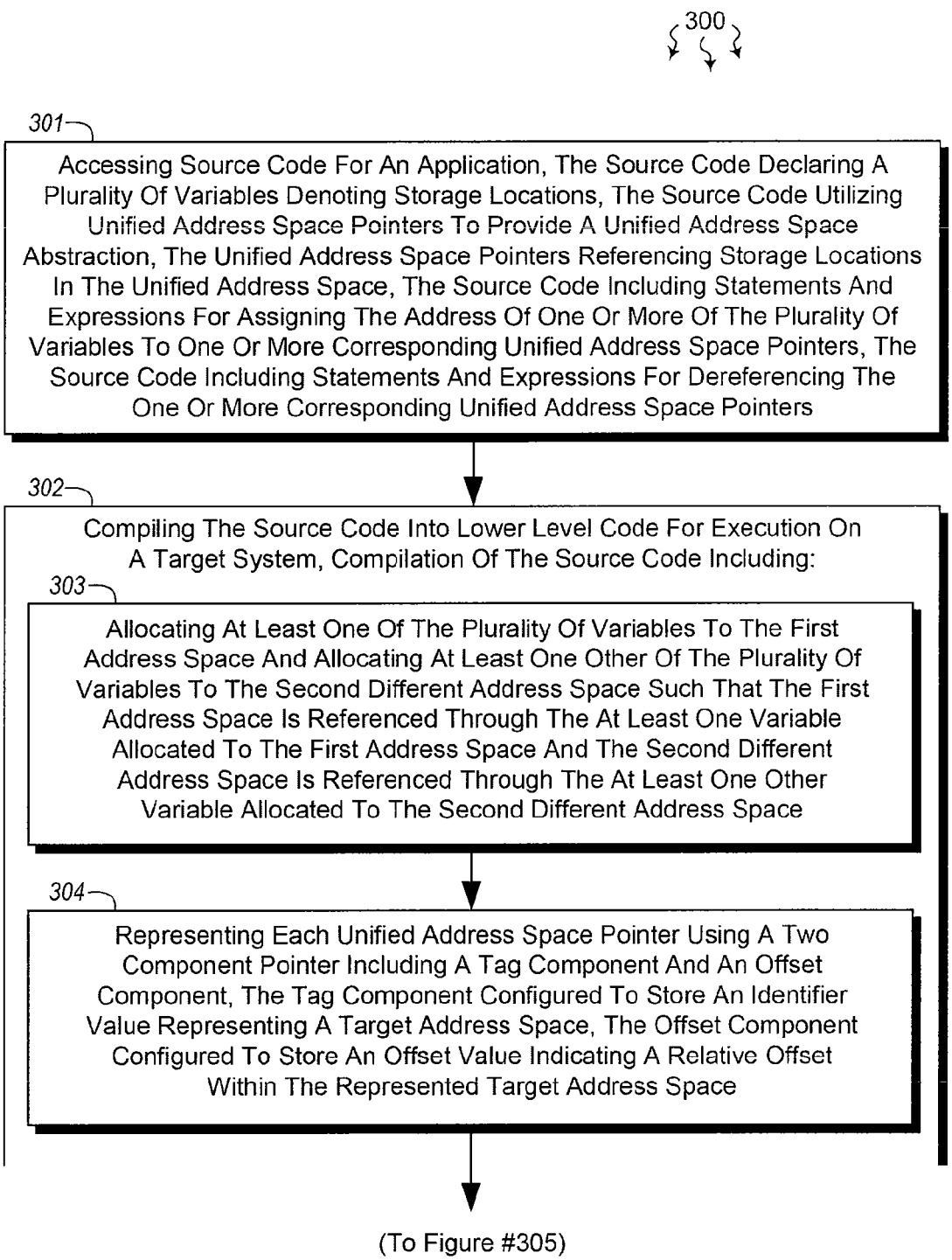
FIG. 3 illustrates a flow chart of an example method for recording debug information for an application.
Figure 3:
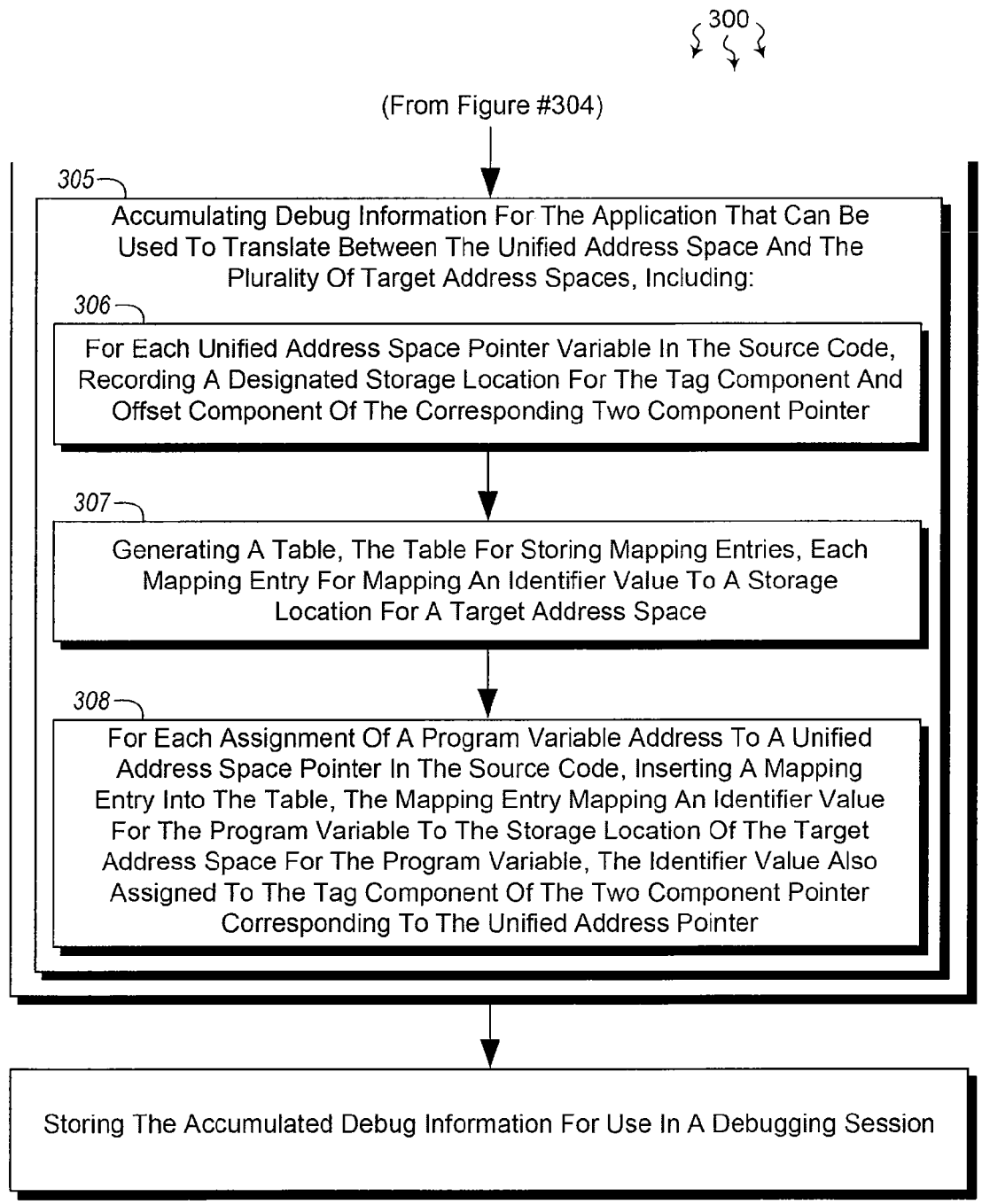

FIG. 3 illustrates a flow chart of an example method 300 for recording debug information for an application. Method 300 will be described with respect to the components and data of computer architecture 100.

Method 300 includes an act of accessing source code for the application, the source code declaring a plurality of variables denoting storage locations, the source code utilizing unified address space pointers to provide a unified address space abstraction, the unified address space pointers referencing storage locations in the unified address space, the source code including statements and expressions for assigning the address of one or more of the plurality of variables to one or more corresponding unified address space pointers, the source code including statements and expressions for dereferencing the one or more corresponding unified address space pointers (act 301). For example, compiler 101 can access higher level code 111 (e.g., C++ extended for parallel environments), including statements and expressions 112. Statements and expressions 112 include variable declarations 105, pointer definitions 109, and pointer usage 182. Variable declarations 105 declare variables 106 and 107 and pointer variable 108.

Each declared variable, such as, for example, variables 106 and 107, denotes a storage location. Pointer variable 108 and other pointer variables can be unified address space pointers that provide a unified address space abstraction. Pointer variable 108 and other pointer variables reference storage locations in the unified address space. Pointer definitions 109 include statements and expressions for assigning an address of a variable (e.g., variable 106 or variable 107) to pointer variable 108. Pointer usage 182 includes statements and expressions for dereferencing pointer variable 108.

Method 300 includes an act of compiling the source code into lower level code for execution on a target system (act 302). For example, compiler 101 can compile high level code 111 into lower level code 121. Lower level code 121 can be HLSL byte code for execution on a GPU. The GPU can have multiple address spaces, and may assign each declared variable to its own address space.

Act 302 includes an act of allocating at least one of the plurality of variables to the first address space and allocating at least one other of the plurality of variables to the second different address space such that the first address space is referenced through the at least one variable allocated to the first address space and the second different address space is referenced through the at least one other variable allocated to the second different address space (act 303). For example, compiler 101 can allocate variable 106 to one of the address spaces of the GPU and can allocate variable 107 to another of the address spaces of the GPU. Accordingly, the address space is referenced through variable 106 and the other address space is referenced through variable 107.

Act 303 includes an act of representing each unified address space pointer using a two component pointer including a tag component and an offset component, the tag component configured to store an identifier value representing a target address space, the offset component configured to store an offset value indicating a relative offset within the represented target address space (act 304). For example, compiler 101 can represent pointer variable 108 using pointer structure 118, including tag component 124 and offset component 122. Tag component 124 is configured to store an identifier value representing a target address space of the GPU (e.g., the address space of variable 106 or variable 107). Offset component 122 is configured to store an offset value indicating a relative offset within the target address space represented by identifier value stored in Tag component 124.

Act 303 includes an act of accumulating debug information for the application that can be used to translate between the unified address space and the plurality of target address spaces (act 305). For example, compiler 101 can accumulate debug information 123. Debug information 123 can be used to translate between the unified address space of higher level code 111 and the multiple address spaces of the GPU during debugging of higher level code 111 within a GPU debugger.

Act 305 includes for each unified address space pointer variable in the source code, an act of recording a designated storage location for the tag component and offset component of the corresponding two component pointer (act 306). For example, for pointer variable 108, compiler 101 can record tag component location 131 and offset component location 132 indicating the designated storage location (e.g., memory, register, etc.) of tag component 124 and offset component 122 respectively.

Act 305 includes an act of generating a table, the table for storing mapping entries, each mapping entry for mapping an identifier value to a storage location for a target address space (act 307). For example, compiler 101 can generate table 119. Table 119 can store entries mapping identifier values to a storage location (e.g., memory, register, etc.) for a target address space. Combined debug information can be used to map the storage location back to a declared variable in higher level code 111.

Act 305 includes an act of, for each assignment of a program variable address to a unified address space pointer in the source code, an act of inserting a mapping entry into the table, the mapping entry mapping an identifier value for the program variable to the storage location of the target address space for the program variable, the identifier value also assigned to the tag component of the two component pointer corresponding to the unified address pointer (act 308). For example, compiler 101 can insert mapping entries 156 and 157 into table 119. Each of mapping entries 156 and 157 can correspond to a location in pointer definitions 109 assigning a program variable address to a unified address space pointer. For example, entry 156 can correspond to assigning the address of variable 106 to pointer variable 108. Likewise, entry 157 can correspond to assigning the address of variable 107 to pointer variable 108.

The identifiers stored in table 119 are also the identifiers that are to be assigned as values of tag components during execution of lower level code 121. For example, during execution of lower level code 121, tag component 124 can be assigned the value of identifier 146 to represent assigning the address of variable 106 to pointer variable 108. Similarly, during execution of lower level code 121, tag component 124 can be assigned the value of identifier 147 to represent assigning the address of variable 107 to pointer variable 108.

Act 305 can also include generating debug information that directly maps between locations and symbols in higher level code and addresses and registers in lower level code. For example, compiler 101 can generate debug information that directly maps between locations and symbols in higher level code 111 (e.g., C++ extended for parallel environments) and addresses and registers in lower level code 121 (e.g., HLSL byte code). Compiler 101 can record these direct mappings in debug information 123.

Act 302 includes an act of storing the accumulated debug information for use in a debugging session (act 309). For example, compiler 101 can store debug information 123 for use in debugging higher level code 111 in session of a GPU debugger. Debug information 123 can be stored in lower level code 121, in a separate file, or partially within lower level code 121 and partially within separate file.

Figure 2:
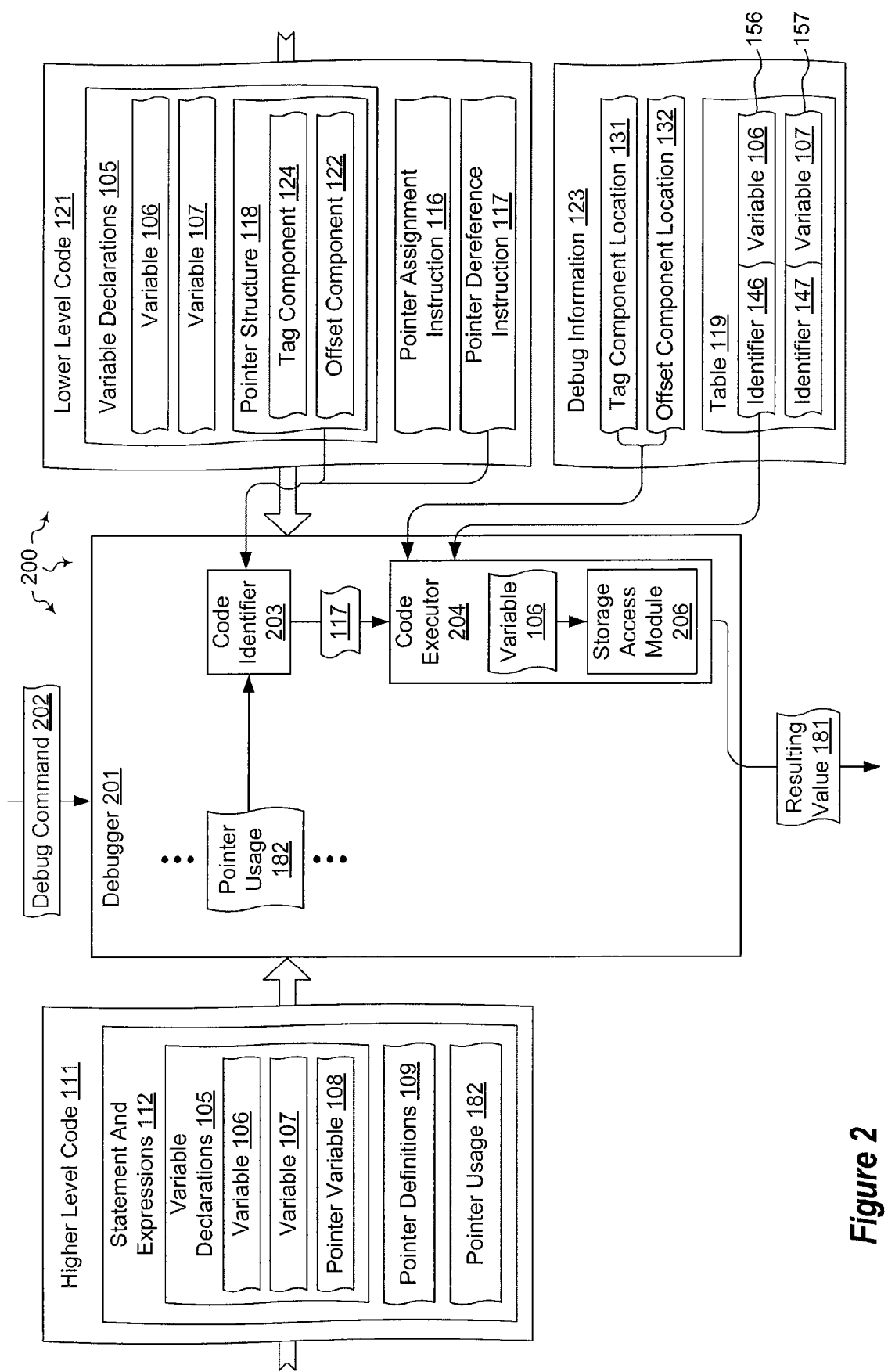
FIG. 2 illustrates an example computer architecture that facilitates debugging an application.

FIG. 2 illustrates an example computer architecture 200 that facilitates debugging an application. Referring to FIG. 2, computer architecture 200 includes debugger 201. Components of debugger 201 can be connected to one another over (or be part of) a system bus and/or a network, such as, for example, a Local Area Network ("LAN"), a Wide Area Network ("WAN"), and even the Internet. Accordingly, each of the components of debugger 201 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

Generally, debugger 201 is a debugger for a co-processor, such as, for example, a GPU or other accelerator. Debugger 201 can be used to debug higher level code that is compiled into lower level code for execution on the co-processor. Debugger 201 can be a symbolic debugger. As depicted, debugger 201 includes code identifier 203, code executor 204, and storage access module 206.

Code identifier 203 is configured to identify lower level instructions that correspond to higher level statements and expressions accessed by debugger 201. Code executor 204 is configured to execute the lower level instructions in the runtime of the co-processor (e.g., a GPU runtime or other accelerator runtime). In some embodiments, lower level code requests access to a storage location to obtain the value of a variable. Storage access module 206 is configured to access a storage location (e.g., a register or memory location of a GPU or other accelerator) to obtain at value stored at the storage location.

Figure 4:
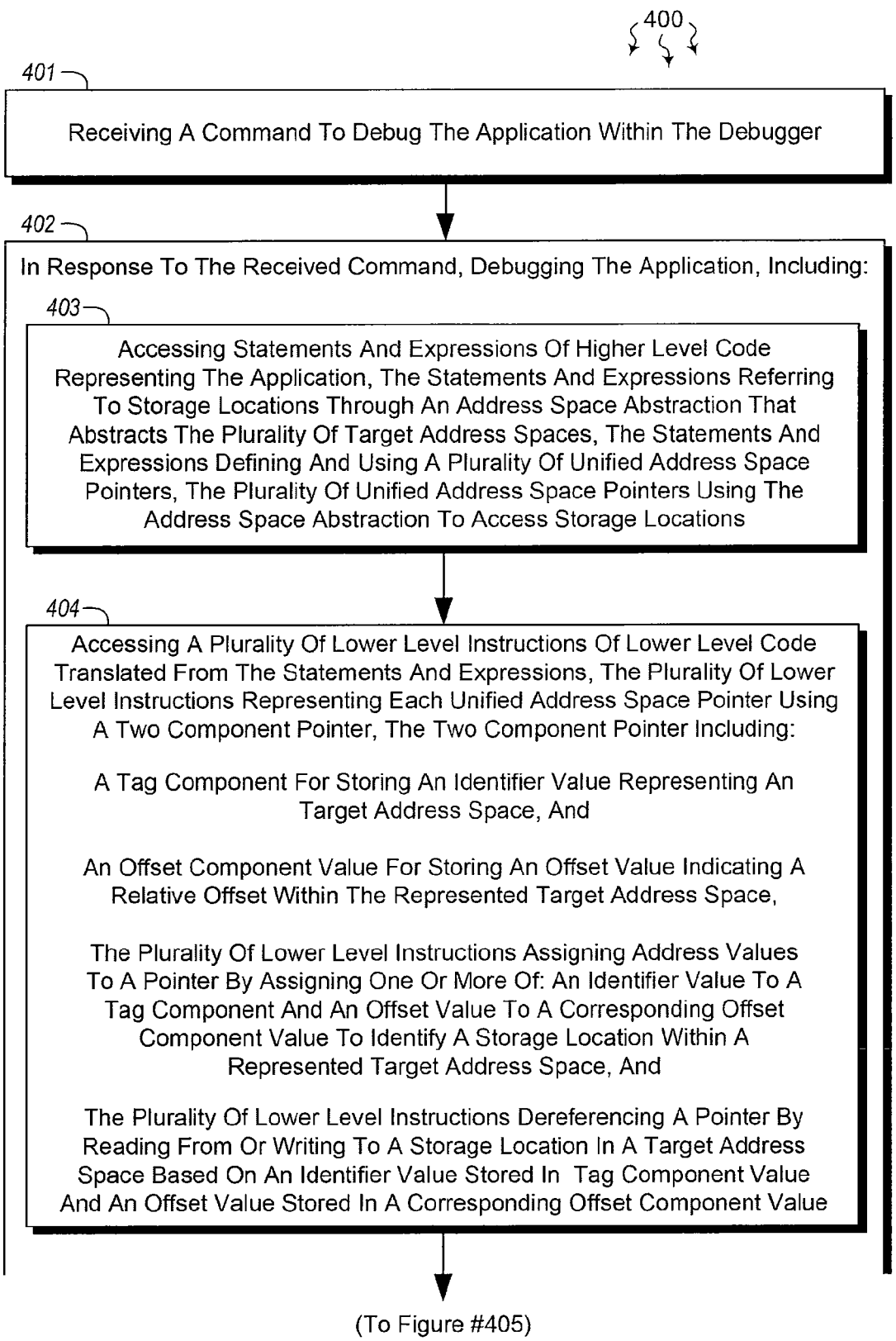
FIG. 4 illustrates a flow chart of an example method for debugging an application.
Figure 4:
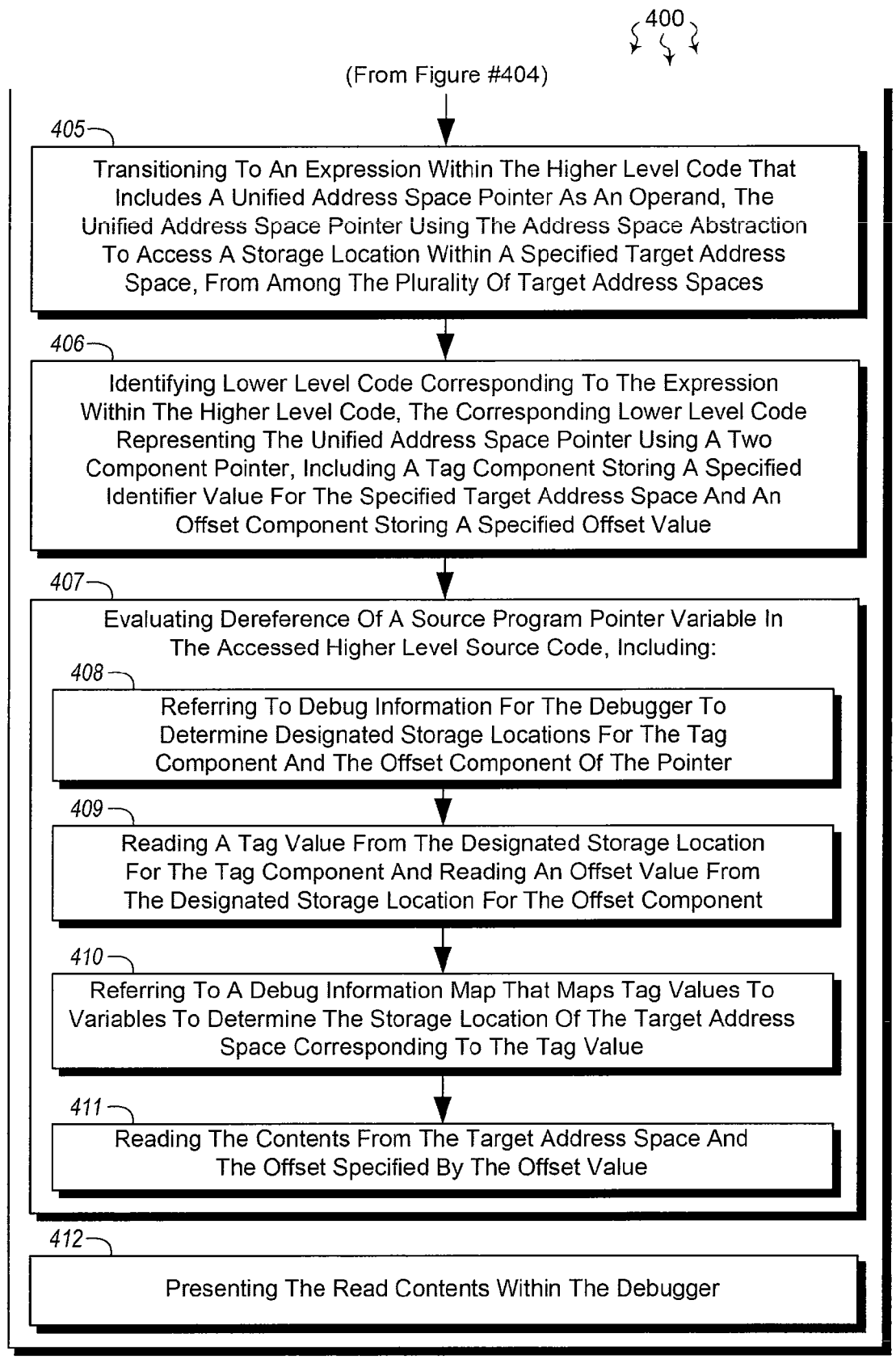

FIG. 4 illustrates a flow chart of an example method 400 for debugging an application. Method 400 will be described with respect to the components and data of computer architecture 200.

Method 400 includes an act of receiving a command to debug an application within the debugger (act 401). For example, debugger 201 can receive debug command 202.

Debug command 202 can be a request to debug an application represented by higher level code 111 and lower level code 121.

Method 400 includes in response to the received command, an act of debugging the application (act 402). For example, in response to debug command 202, debugger 201 can debug the application represented by higher level code 111 and lower level code 121.

Act 402 includes an act of accessing statements and expressions of higher level code representing the application, the statements and expressions referring to storage locations through an address space abstraction that abstracts the plurality of target address spaces, the statements and expressions defining and using a plurality of unified address space pointers, the plurality of unified address space pointers using the address space abstraction to access storage locations (act 403). For example, debugger 201 can access higher level code 111 (e.g., C++ extended for parallel environments). As described, higher level code 111 can use unified address space pointers, such as, for example, pointer variable 108, to access storage locations using an address space abstraction.

Act 402 includes an act of accessing a plurality of lower level instructions of lower level code translated from the statements and expressions (act 404). For example, debugger 201 can access lower level code 121 (e.g., HLSL byte code). The plurality of lower level instructions represents each unified address space pointer using a two component pointer, including a tag component and an offset component. The tag component stores an identifier value representing a target address space. The offset component stores an offset component value indicating a relative offset within the represented target address space. For example, tag component 124 can store an identifier value representing variable 106 or variable 107. Offset component 122 can store an offset value indicating a relative offset within a represented variable.

The lower level instructions assign address values to a pointer by assigning one or more of: an identifier value to a tag component and an offset value to a corresponding offset component value to identify a storage location within a represented target address space. For example, pointer assignment instruction 116 can assign an identifier value to tag component 124 and/or an offset value to offset component 122. Collectively, any assigned values can identify a storage location (e.g., register or memory location) within a target address space on a co-processor (e.g., a GPU or other accelerator). Pointer assignment instructions 116 can implement a portion of pointer definitions 109.

The lower level instructions dereference a pointer by reading from or writing to a storage location in a target address space based on an identifier value stored in tag component value and an offset value stored in a corresponding offset component value. For example, pointer dereference instruction 117 can dereference a pointer (e.g., a unified address space pointer represented by pointer variable 108) by reading from or writing to a storage location within a target address space of the co-processor. Pointer dereference instruction 117 can dereference the pointer based on an identifier value stored in tag component 124 and an offset value stored in offset component 122. Pointer dereference instructions can implement a portion of pointer usage 182.

Act 402 includes an act of transitioning to an expression within the higher level code that includes a unified address space pointer as an operand, the unified address space pointer using the address space abstraction to access a storage location within a specified target address space, from among the plurality of target address spaces (act 405). For example, debugger 201 can jump or step to pointer usage 182. With higher level code 111, pointer usage 182 can include pointer variable 108 as an operand. It may be that pointer usage 182 dereferences pointer variable 108. Through pointer definitions 109, pointer variable 108 can previously have been assigned the address of variable 106. As such, dereferencing pointer variable 108 is essentially a request for the value stored at the assigned address.

Act 402 includes an act of identifying lower level code corresponding to the expression within the higher level code, the corresponding lower level code representing the unified address space pointer using a two component pointer, including a tag component storing a specified identifier value for the specified target address space and an offset component storing a specified offset value (act 406). For example, code identifier 203 can identify pointer dereference instruction 117 as corresponding to pointer usage 182. Pointer dereference instruction 117 can use tag component 124 and offset component 122 to represent pointer variable 108.

Act 402 includes an act of evaluating dereference of a source program pointer variable in the accessed higher level source code (act 407). For example, code executor 204 can evaluate pointer dereference instruction 117 (in a co-processor runtime).

Act 407 includes an act of referring to debug information for the debugger to determine designated storage locations for the tag component and the offset component of the pointer (act 408). For example, code executor 204 can refer to debug information 123 to determine tag component location 131 and offset component location 132. Act 407 includes an act of reading a tag value from the designated storage location for the tag component and reading an offset value from the designated storage location for the offset component (act 409). For example, code executor 204 can read identifier 146 from tag component location 131 and can read an offset value from offset component location 132.

Act 407 includes an act of referring to a debug information map that maps tag values to variables to determine the storage location of the target address space corresponding to the tag value (act 410). For example, code executor 204 can refer to table 119 to determine the storage location of the target address space corresponding to the tag value. Code executor 204 can identify mapping entry 156 as corresponding to identifier 146. Code executor 204 can further determine that entry 156 corresponds to variable 106. Code executor 204 can use further debug information to map variable 106 to the storage location (e.g., register or memory location of the co-processor). Act 407 includes an act of reading the contents from the target address space and the offset specified by the offset value (act 411). For example, code executor 204 can read resulting value 181 based on the target address space and the offset specified by the offset value.

Act 402 includes an act of presenting the read contents within the debugger (act 412). For example, resulting value 181 can be presented in a user-interface of debugger 201.

The following code example, utilizes a unified address space abstraction through the user of pointers as references to locations in the unified address space:

```
int a[4], b, c;
int *p;
if (c == 0) {
    p = &a[2];
}
else {
    p = &b;
```

-continued

```
}
c = *p;
```

Within the code example, symbols a, b and c denote storage locations in the program. Symbols a, b, and c can be allocated to different address spaces in a target system (e.g., a co-processor) by a compiler. To implement a unified address space pointer (reference) in such a system, both the identity of the address space (among the multiple address spaces in the system) of the referenced location, and the offset of the location within that address space are recorded. The address space identity and offset can be used to uniquely identify the location across the different address spaces in the target system. Thus, as described, a unified address space reference/pointer can be represented as a two component value, a tag (address space ID) and offset (relative offset within address space).

In some embodiments, each variable in a program is allocated to a distinct address space. Thus, each address space in the target system is referenced through the variable that is allocated to that address space. Whenever the compiler encounters an assignment of the address of ('&') a program variable to a pointer, the compiler associates a unique integer identifier with the program variable in an internal map. The internal map maps from variable IDs to variable names. The compiler also assigns the ID to the tag component of the pointer and assigns the offset of the address taken variable from its base to the offset component.

The values of the tag and offset components are appropriately managed across assignment and arithmetic operations on the pointer variable. On assignment of a pointer to another pointer, a source pointer's tag and offset values are assigned to a destination pointer's tag and offset values. As such, arithmetic operations result in appropriate update to the offset component of a pointer. On a pointer dereference, the contents of the location referenced by the pointer are obtained by generating a switch statement on the pointer's tag value. Each switch case corresponds to a program variable whose address was taken (through the "&" operator) in the program.

Returning to the previously code example, it may be that the compiler assigns IDs 0 and 1 respectively to the variables "a" and "b" (variables on which the "&" operator is applied in the program). Table 1 depicts the mapping between address IDs and variable names.

TABLE 1

| Address ID | -> | Variable name |
|---|---|---|
| 0 | -> | a |
| 1 | -> | b |

The compiler generated code corresponding to the code example can look like:

```
int a[4], b, c;
unified_ptr p;
if (c == 0) {
    p.tag = 0 // Variable "a" is assigned an ID of 0 as indicated in the
    above map
    p.offset = 2;
}
else {
    p.tag = 1 // Variable "b" is assigned an ID of 1 as indicated in the
    above map
    p.offset = 0;
```

```
}
int value;
switch (p.tag) {
case 0:
        value = a[p.offset];
case 1:
        value = b[p.offset];
};
c = value;
```

Debugging support for a unified address space abstraction can be implemented by recording the mapping from compiler assigned internal IDs to the names of the program's address-taken variables, in the program's debug information. For example, when using C++ extended for parallel environments, the PDB record in Table 2 can be defined to record the mapping from compiler assigned variable IDs to source variable names in the source program:

TABLE 2

| 2 | 2 | * |
|---|---|---|
| length | S_DPC_SYM_TAG_MAP | map_entries | wherein

```
struct DPC_SYM_TAG_MAP_ENTRY
{
    DWORD   tag_value;                       // tag value for symbol
    DWORD   variable_debug_info_reference ;  // Reference to the
debug info for the variable indicating the variable's designated storage
location(s)};
``` and map_entries—A variable size array of DPC_SYM_TAG_MAP_ENTRY struct instances each representing a tag value to symbol debug info entry. The entries can be sorted by the tag values.

Accordingly, within a live debugging session, the contents of a unified address space pointer (reference) can be accessed using the following algorithm:

(a) Determine the designated storage locations of the tag and offset components of the pointer from the debug information, (b) Read the pointer's tag and offset values from their designated storage locations to obtain the location's address space integer ID and its offset within the address space, (c) Find the variable that the pointer's tag value (address space integer ID) corresponds to, by performing a lookup in the address space ID to variable map stored in the program's debug information, and (d) The location referenced by the pointer can now be resolved as "<Variable from step c>[pointer.offset]"

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a compiler, a method for recording debug information for an application, the debugging information mapping between a unified address space and a plurality of target address spaces, including at least a first address space and a second different address space, the method comprising:

an act of accessing source code for the application, the source code declaring a plurality of variables denoting storage locations, the source code utilizing unified address space pointers to provide a unified address space abstraction, the unified address space pointers referencing storage locations in the unified address space, the source code including statements and expressions for assigning the address of one or more of the plurality of variables to one or more corresponding unified address space pointers, the source code including statements and expressions for dereferencing the one or more corresponding unified address space pointers;

an act of compiling the source code into lower level code for execution on a target system, compilation of the source code including:

an act of allocating at least one of the plurality of variables to the first address space and allocating at least one other of the plurality of variables to the second different address space such that the first address space is referenced through the at least one variable allocated to the first address space and the second different address space is referenced through the at least one other variable allocated to the second different address space;

an act of representing each unified address space pointer using a two component pointer including a tag component and an offset component, the tag component configured to store an identifier value representing a target address space, the offset component configured to store an offset value indicating a relative offset within the represented target address space; and an act of accumulating debug information for the application that can be used to translate between the unified address space and the plurality of target address spaces, including:

for each unified address space pointer variable in the source code, an act of recording a designated storage location for the tag component and offset component of the corresponding two component pointer;

an act of generating a table, the table for storing mapping entries, each mapping entry for mapping an identifier value to a storage location for a target address space; and for each assignment of a program variable address to a unified address space pointer in the source code, an act of inserting a mapping entry into the table, the mapping entry mapping an identifier value for the program variable to the storage location of the target address space for the program variable, the identifier value also assigned to the tag component of the two component pointer corresponding to the unified address pointer; and an act of storing the accumulated debug information for use in a debugging session.

2. The method as recited in claim 1, wherein the act of accessing source code for the application comprises an act of accessing C++ source code that has been extended for parallel environments.

3. The method as recited in claim 1, wherein the act of compiling the source code into lower level code for execution on a target system comprises an act of compiling the source code into lower level code for execution on a co-processor.

4. The method as recited in claim 1, wherein the act of compiling the source code into lower level code for execution on a target system comprises an act of compiling the source code High Level Shader Language ("HLSL") byte code.

5. The method as recited in claim 1, wherein an act of allocating at least one of the plurality of variables to the first address space and allocating at least one other of the plurality of variables to the second different address space comprises an act of allocating each declared variable to its own address space.

6. The method as recited in claim 1, wherein the act of inserting a mapping entry into the table comprises an act of inserting a mapping that maps an identifier value for the program variable to one of: a register or a memory location on the target system.

7. The method as recited in claim 1, wherein the act of storing the accumulated debug information for use in a debugging session comprises an act of storing at least part of the accumulated debug information along with the lower level code.

8. The method as recited in claim 1, wherein the act of storing the accumulated debug information for use in a debugging session comprises an act of storing the accumulated debug information in a Program Database ("PDB") file.

9. At a computer system including one or more processors and system memory, the computer system also including a debugger, a method for debugging an application that is configured to use a plurality of target address spaces, including at least a first address space and a second different address space, the method comprising:

an act of receiving a command to debug the application within the debugger;

in response to the received command, an act of debugging the application, including:

an act of accessing statements and expressions of higher level code representing the application, the statements and expressions referring to storage locations through an address space abstraction that abstracts the plurality of target address spaces, the statements and expressions defining and using a plurality of unified address space pointers, the plurality of unified address space pointers using the address space abstraction to access storage locations;

an act of accessing a plurality of lower level instructions of lower level code translated from the statements and expressions, the plurality of lower level instructions representing each unified address space pointer using a two component pointer, the two component pointer including:

a tag component for storing an identifier value representing a target address space, and an offset component value for storing an offset value indicating a relative offset within the represented target address space, the plurality of lower level instructions assigning address values to a pointer by assigning one or more of: an identifier value to a tag component and an offset value to a corresponding offset component value to identify a storage location within a represented target address space, and the plurality of lower level instructions dereferencing a pointer by reading from or writing to a storage location in a target address space based on an identifier value stored in tag component value and an offset value stored in a corresponding offset component value;

an act of evaluating dereference of a source program pointer variable in the accessed higher level source code, including:

an act of referring to debug information for the debugger to determine designated storage locations for the tag component and the offset component of the pointer;

an act of reading a tag value from the designated storage location for the tag component and reading an offset value from the designated storage location for the offset component;

an act of referring to a debug information map that maps tag values to variables to determine the storage location of the target address space corresponding to the tag value; and an act of reading the contents from the target address space and the offset specified by the offset value.

10. The method as recited in claim 9, wherein the act of receiving a command to debug the application within the debugger comprises an act of receiving a command to debug an application within a co-processor symbolic debugger.

11. The method as recited in claim 9, wherein the act of accessing statements and expressions of higher level code representing the application comprises an act of accessing C++ extended for parallel environments.

12. The method as recited in claim 9, wherein the act of accessing a plurality of lower level instructions of lower level code translated from the statements and expressions comprises an act of accessing HLSL byte code.

13. The method as recited in claim 9, wherein the act of accessing a plurality of lower level instructions of lower level code translated from the statements and expressions comprises an act of accessing lower level code compiled for execution on a co-processor.

14. The method as recited in claim 9, wherein the act of referring to debug information for the debugger comprises an act of referring to a Program Database ("PDB") file.

15. The method as recited in claim 9, wherein the act of reading the contents from the target address space and the offset specified by the offset value comprises act of accessing the contents from one of: a register and a memory location.

16. The method as recited in claim 9, wherein the act of an act of reading the contents from the target address space and the offset specified by the offset value comprises an act of reading the contents from a storage location at a co-processor.

17. A computer program product for use at a computer system, the computer program product for implementing a method for debugging an application that is configured to use a plurality of target address spaces, the computer program product comprising one or more computer storage devices having stored thereon computer-executable instructions that, when executed at a processor, cause the computer system to perform the method, including the following:

receive a command to debug the application within a Graphical Processing Unit ("GPU") debugger;

in response to the received command, debug the application within the GPU debugger, including:

access statements and expressions of C++ source code representing the application, the statements and expressions referring to storage locations through an address space abstraction that abstracts the plurality of target address spaces, the statements and expressions defining and using a plurality of unified address space pointers, the plurality of unified address space pointers using the address space abstraction to access storage locations;

access a High Level Share Language ("HLSL") byte code instructions compiled from the C++ source code, the HLSL byte code instructions representing each unified address space pointer using a two component pointer, the two component pointer including:

a tag component for storing an identifier value representing a target address space at the GPU, and an offset component value for storing an offset value indicating a relative offset within the represented target address space at the GPU, the HLSL byte code instructions assigning address values to a pointer by assigning one or more of: an identifier value to a tag component and an offset value to a corresponding offset component value to identify a storage location within a represented target address space at the GPU, and the HLSL byte code instructions dereferencing a pointer by reading from or writing to a storage location in a target address space at the GPU based on an identifier value stored in tag component value and an offset value stored in a corresponding offset component value;

evaluate dereference of a source program pointer variable in the accessed C++ source code, including:

refer to debug information for the GPU debugger to determine designated storage locations for the tag component and the offset component of the pointer;

read a tag value from the designated storage location for the tag component and reading an offset value from the designated storage location for the offset component;

refer to a debug information map that maps tag values to variables to determine the storage location of the target address space corresponding to the tag value; and read the contents from the target address space and the offset specified by the offset value.

18. The computer program product as recited in claim 17, further comprising computer-executable instructions that, when executed at a processor, cause the computer system to present the read contents within the GPU debugger.

19. The computer program product as recited in claim 17, wherein computer executable instructions that, when executed, cause the computer system to read the contents from the target address space and the offset specified by the offset value comprise computer executable instructions that, when executed, cause the computer system to access the contents from one of: a register and a memory location.

20. The computer program product as recited in claim 17, wherein computer executable instructions that, when executed, cause the computer system to read the contents from the target address space and the offset specified by the offset value comprise computer executable instructions that, when executed, cause the computer system to read the contents from a storage location at a co-processor.

* * * * *